(12) United States Patent
Ayichew (10) Patent No.: US 10,773,698 B2
(45) Date of Patent: Sep. 15, 2020

(54) PRIMARY BRAKE CONTROL SYSTEM WITH ALTERNATE VEHICLE SYSTEM OVERRIDE

(71) Applicant: GOODRICH CORPORATION, Charlotte, NC (US)

(72) Inventor: Efrem E. Ayichew, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 312 days.

(21) Appl. No.: 15/714,947

(22) Filed: Sep. 25, 2017

(65) Prior Publication Data
US 2019/0092297 A1    Mar. 28, 2019

(51) Int. Cl.
| | | |
|---|---|---|
| *B60T 8/88* | (2006.01) | |
| *B60T 13/66* | (2006.01) | |
| *B60T 8/17* | (2006.01) | |
| *B60T 8/172* | (2006.01) | |
| *B60T 17/22* | (2006.01) | |

(Continued)

(52) U.S. Cl.
CPC ............... *B60T 8/885* (2013.01); *B60T 7/16* (2013.01); *B60T 8/172* (2013.01); *B60T 8/1703* (2013.01); *B60T 13/662* (2013.01); *B60T 13/68* (2013.01); *B60T 17/221* (2013.01); *B60T 2270/402* (2013.01)

(58) Field of Classification Search
CPC ...... B60T 8/885; B60T 13/662; B60T 8/1703; B60T 2270/402; B60T 17/221
USPC .......................................................... 701/2
See application file for complete search history.

(56) References Cited

U.S. PATENT DOCUMENTS

| | | | | |
|---|---|---|---|---|
| 4,360,239 A | * | 11/1982 | Boehringer | B64C 25/44 244/111 |
| 6,014,600 A | * | 1/2000 | Ferri | B60T 13/665 701/19 |

(Continued)

FOREIGN PATENT DOCUMENTS

| | | |
|---|---|---|
| CN | 103803063 | 5/2014 |
| CN | 204250386 | 4/2015 |

(Continued)

OTHER PUBLICATIONS

European Oatent Office, European Search Report dated Feb. 20, 2019 in Application No. 18196463.6.

*Primary Examiner* — Khoi H Tran
*Assistant Examiner* — Rodney P King
(74) *Attorney, Agent, or Firm* — Shell & Wilmer LLP (57) ABSTRACT

A system includes a first brake actuator for controlling pressure applied to a first brake, a BCU configured to receive a first plurality of inputs and to output a first BCU control signal for controlling the first brake actuator based on the first plurality of inputs, and a first switch coupled between the first brake actuator and the BCU. The system also includes a backup controller designed to receive a second plurality of inputs, determine a first backup control signal for controlling the first brake actuator based on the second plurality of inputs, determine that the BCU is functioning improperly based on the second plurality of inputs, and control the first switch to prevent the first BCU control signal from controlling the first brake actuator and to output the first backup control signal to the first brake actuator in response to determining that the BCU is functioning improperly.

20 Claims, 3 Drawing Sheets

(51) Int. Cl.
*B60T 13/68* (2006.01)
*B60T 7/16* (2006.01)

(56) References Cited

U.S. PATENT DOCUMENTS

| | | | | |
|---|---|---|---|---|
| 6,513,885 | B1* | 2/2003 | Salamat | B60T 8/1703 |
| | | | | 303/122.09 |
| 6,557,952 | B1* | 5/2003 | Robertson | B60T 7/16 |
| | | | | 303/122.08 |
| 2005/0029864 | A1* | 2/2005 | Bauer | B60T 7/12 |
| | | | | 303/191 |
| 2009/0276133 | A1 | 11/2009 | May et al. | |
| 2010/0274458 | A1* | 10/2010 | Cahill | B60T 8/1703 |
| | | | | 701/76 |
| 2010/0276988 | A1* | 11/2010 | Cahill | B60T 8/1703 |
| | | | | 303/20 |
| 2010/0286881 | A1* | 11/2010 | Cahill | B60T 8/00 |
| | | | | 701/70 |
| 2011/0121640 | A1 | 5/2011 | Matsuyama et al. | |
| 2012/0145490 | A1* | 6/2012 | Clary | B60T 8/1703 |
| | | | | 188/1.11 E |
| 2013/0006447 | A1 | 1/2013 | Thibault et al. | |
| 2015/0127195 | A1* | 5/2015 | Cahill | B60T 8/1703 |
| | | | | 701/3 |
| 2016/0059956 | A1* | 3/2016 | Cahill | B60T 8/1703 |
| | | | | 74/491 |
| 2017/0144750 | A1* | 5/2017 | Cahill | B60T 8/1703 |
| 2019/0176973 | A1* | 6/2019 | Cahill | B60T 8/1703 |

FOREIGN PATENT DOCUMENTS

| | | |
|---|---|---|
| EP | 2878501 | 6/2015 |
| EP | 3279045 | 2/2018 |
| GB | 2200505 | 8/1988 |
| WO | 0069721 | 11/2000 |
| WO | 0105655 | 1/2001 |

* cited by examiner

PRIMARY BRAKE CONTROL SYSTEM WITH ALTERNATE VEHICLE SYSTEM OVERRIDE

FIELD

The present disclosure relates to control systems and methods for redundant control of brake valves for an aircraft.

BACKGROUND

Aircraft typically include an engine or a motor designed to propel the aircraft through the air. Many aircraft also include landing gear having wheels to allow the aircraft to travel along the ground during taxi, takeoff, and landing. It may be desirable for aircraft to be capable of braking via the landing gear wheels. In that regard, aircraft may further include brakes for providing such braking. These brakes are often controlled by a brake control unit (BCU). Many of these brakes are hydraulic brakes and include valves for regulating the pressure applied to the hydraulic brakes. The BCU may control the brake valves to regulate the pressure of fluid applied to the brakes.

SUMMARY

A system for controlling a brake actuator corresponding to a first brake in accordance with various embodiments includes a first brake actuator configured to control pressure applied to the first brake. The system also includes a brake control unit (BCU) configured to receive a first plurality of inputs and to output a first BCU control signal for controlling the first brake actuator based on the first plurality of inputs. The system also includes a first switch coupled between the first brake actuator and the BCU. The system also includes a backup controller electronically coupled to the first switch and the first brake actuator. The backup controller is designed to receive a second plurality of inputs, determine a first backup control signal for controlling the first brake actuator based on the second plurality of inputs, determine that the BCU is functioning improperly based on the second plurality of inputs, and control the first switch to prevent the first BCU control signal from controlling the first brake actuator and to output the first backup control signal to the first brake actuator in response to determining that the BCU is functioning improperly.

In any of the foregoing embodiments, the first brake actuator includes a first brake valve, a first coil coupled to the first switch and configured to control the first brake valve based on the first BCU control signal, and a second coil coupled to the backup controller and configured to control the first brake valve based on the first backup control signal.

Any of the foregoing embodiments may also include a first diode connected in parallel with the first coil and configured to allow current to flow through the first coil until a voltage across the first coil decays in response to the first switch preventing the first BCU control signal from controlling the first brake actuator.

In any of the foregoing embodiments, the backup controller is configured to be included in an avionics unit of an aircraft.

Any of the foregoing embodiments may also include a second brake actuator configured to control pressure applied to a second brake, and a second switch coupled between the second brake actuator and the BCU, wherein the BCU is further configured to output a second BCU control signal for controlling the second brake actuator based on the first plurality of inputs, and the backup controller is further configured to determine a second backup control signal for controlling the second brake actuator based on the second plurality of inputs, and to control the second switch to prevent the second BCU control signal from controlling the second brake actuator and to output the second backup control signal to the second brake actuator in response to determining that the BCU is functioning improperly.

Any of the foregoing embodiments may also include a third brake actuator configured to operate as a shutoff to allow or prevent pressure from being applied to the first brake and the second brake, and a third switch coupled between the third brake actuator and the BCU, wherein the BCU is further configured to output a third BCU control signal for controlling the third brake actuator based on the first plurality of inputs, and the backup controller is further configured to determine a third backup control signal for controlling the third brake actuator based on the second plurality of inputs, and to control the third switch to prevent the third BCU control signal from controlling the third brake actuator and to output the third backup control signal to the third brake actuator in response to determining that the BCU is functioning improperly.

In any of the foregoing embodiments, the first brake actuator and the second brake actuator are modulating brake valves, and the third brake actuator is an on/off brake valve.

In any of the foregoing embodiments, the first plurality of inputs and the second plurality of inputs include a wheel speed, a brake pressure of the first brake, and at least one of a remote crew command or a cockpit crew command.

In any of the foregoing embodiments, the first switch has a nominal state of closed such that the first BCU control signal flows through the first switch in the nominal state, and has an active state of open in response to being controlled by the backup controller.

A system for controlling a brake valve corresponding to a first brake of an aircraft in accordance with various embodiments includes a first brake valve configured to control pressure applied to the first brake. The system further includes a brake control unit (BCU) configured to receive a first plurality of inputs and to output a first BCU control signal for controlling the first brake valve based on the first plurality of inputs. The system further includes a first switch coupled between the first brake valve and the BCU. The system further includes a backup controller electronically coupled to the first switch and the first brake valve. The backup controller is designed to receive a second plurality of inputs, determine a first backup control signal for controlling the first brake valve based on the second plurality of inputs, determine that the BCU is functioning improperly based on the second plurality of inputs, and control the first switch to prevent the first BCU control signal from controlling the first brake valve and to output the first backup control signal to the first brake valve in response to determining that the BCU is functioning improperly.

In any of the foregoing embodiments, the first brake valve is part of a first brake actuator that further includes a first coil coupled to the first switch and configured to control the first brake valve based on the first BCU control signal, and a second coil coupled to the backup controller and configured to control the first brake valve based on the first backup control signal.

Any of the foregoing embodiments may also include a first diode connected in parallel with the first coil and configured to allow current to flow through the first coil until a voltage across the first coil decays in response to the first switch preventing the first BCU control signal from controlling the first brake valve.

In any of the foregoing embodiments, the backup controller is configured to be included in an avionics unit of the aircraft.

Any of the foregoing embodiments may also include a second brake valve configured to control pressure applied to a second brake, and a second switch coupled between the second brake valve and the BCU, wherein the BCU is further configured to output a second BCU control signal for controlling the second brake valve based on the first plurality of inputs, and the backup controller is further configured to determine a second backup control signal for controlling the second brake valve based on the second plurality of inputs, and to control the second switch to prevent the second BCU control signal from controlling the second brake valve and to output the second backup control signal to the second brake valve in response to determining that the BCU is functioning improperly.

Any of the foregoing embodiments may also include a third brake valve configured to operate as a shutoff to allow or prevent pressure from being applied to the first brake and the second brake, and a third switch coupled between the third brake valve and the BCU, wherein the BCU is further configured to output a third BCU control signal for controlling the third brake valve based on the first plurality of inputs, and the backup controller is further configured to determine a third backup control signal for controlling the third brake valve based on the second plurality of inputs, and to control the third switch to prevent the third BCU control signal from controlling the third brake valve and to output the third backup control signal to the third brake valve in response to determining that the BCU is functioning improperly.

In any of the foregoing embodiments, the first brake valve and the second brake valve are modulating brake valves, and the third brake valve is an on/off brake valve.

In any of the foregoing embodiments, the first plurality of inputs and the second plurality of inputs include a wheel speed, a brake pressure of the first brake, and at least one of a remote crew command or a cockpit crew command.

In any of the foregoing embodiments, the first switch has a nominal state of closed such that the first BCU control signal flows through the first switch in the nominal state, and has an active state of open in response to being controlled by the backup controller.

A method, in accordance with various embodiments, for controlling a brake actuator corresponding to a first brake includes receiving, by a brake control unit (BCU), a first plurality of inputs. The method also includes outputting, by the BCU, a first BCU control signal for controlling a first brake actuator to control pressure applied to the first brake based on the first plurality of inputs. The method also includes receiving, by a backup controller, a second plurality of inputs. The method also includes determining, by the backup controller, a first backup control signal for controlling the first brake actuator based on the second plurality of inputs. The method also includes determining, by the backup controller, that the BCU is functioning improperly based on the second plurality of inputs. The method also includes controlling, by the backup controller, a first switch coupled between the first brake actuator and the BCU to prevent the first BCU control signal from controlling the first brake actuator in response to determining that the BCU is functioning improperly. The method also includes outputting, by the backup controller, the first backup control signal to the first brake actuator in response to determining that the BCU is functioning improperly.

In any of the foregoing embodiments, the first plurality of inputs and the second plurality of inputs include a wheel speed, a brake pressure of the first brake, and at least one of a remote crew command or a cockpit crew command.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
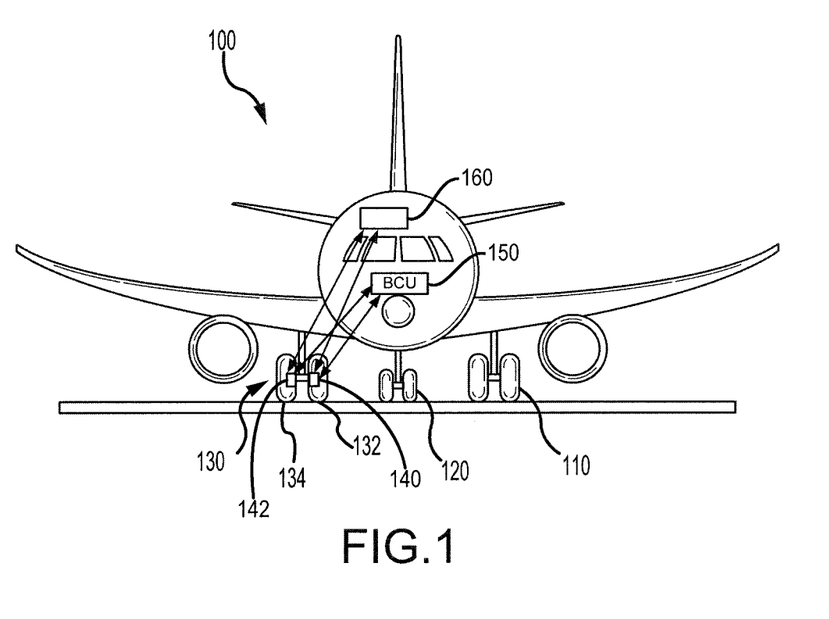
FIG. 1 illustrates an aircraft having multiple landing gear and brakes, in accordance with various embodiments.

Referring now to FIG. 1, an aircraft 100 in accordance with various embodiments can include multiple landing gear including a first landing gear 110, a second landing gear 120, and a third landing gear 130. Each landing gear may include one or more wheel assemblies. For example, the third landing gear 130 includes an inner wheel assembly 132 and an outer wheel assembly 134.

The aircraft 100 may further include one or more brake coupled to each wheel assembly. For example, a first brake 140 may be coupled to the inner wheel assembly 132, and a second brake 142 may be coupled to the outer wheel assembly 134. The first brake 140 may apply a braking force to the inner wheel assembly 132 upon receiving a brake command. Similarly, the second brake 142 may apply a braking force to the outer wheel assembly 134 upon receiving a brake command. In various embodiments, multiple brakes may apply a braking force to the inner wheel assembly 132.

The aircraft 100 may further include a brake control unit (BCU) 150. The BCU 150 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the BCU 150 may be specifically designed for controlling operation of aircraft brakes. The BCU 150 may be a primary controller of the first brake 140 and the second brake 142. In that regard, the BCU 150 may control operation of the first brake 140 and the second brake 142 under normal operating conditions.

The aircraft 100 may further include a backup controller 160. The backup controller 160 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the backup controller 160 may be specifically designed to perform aircraft-related functions such as providing backup control for the BCU 150.

The backup controller 160 may be capable of determining whether the BCU 150 is operating properly. The backup controller 160 may further take control of the first brake 140 and the second brake 142 from the BCU 150 and control operation of the first brake 140 and the second brake 142 in response to determining that the BCU 150 is operating improperly. In that regard, the backup controller 160 may be designed to have a higher reliability than the BCU 150 (i.e., the backup controller 160 may be less likely to fail than the BCU 150).

In various embodiments, the backup controller 160 may be implemented in an avionics unit or be a part of an avionics unit. An avionics unit may control the flight of, and operation of various components of, the aircraft 100. The avionics unit may control various parameters of flight and may include, for example, a traffic avoidance system, an air traffic management system, an autothrust system, an autopilot system, a flight control system, hydraulics systems, pneumatics systems, environmental systems, electrical systems, engine systems, trim systems, lighting systems, crew alerting systems, electronic checklist systems, an electronic flight bag, and the like.

Figure 2:
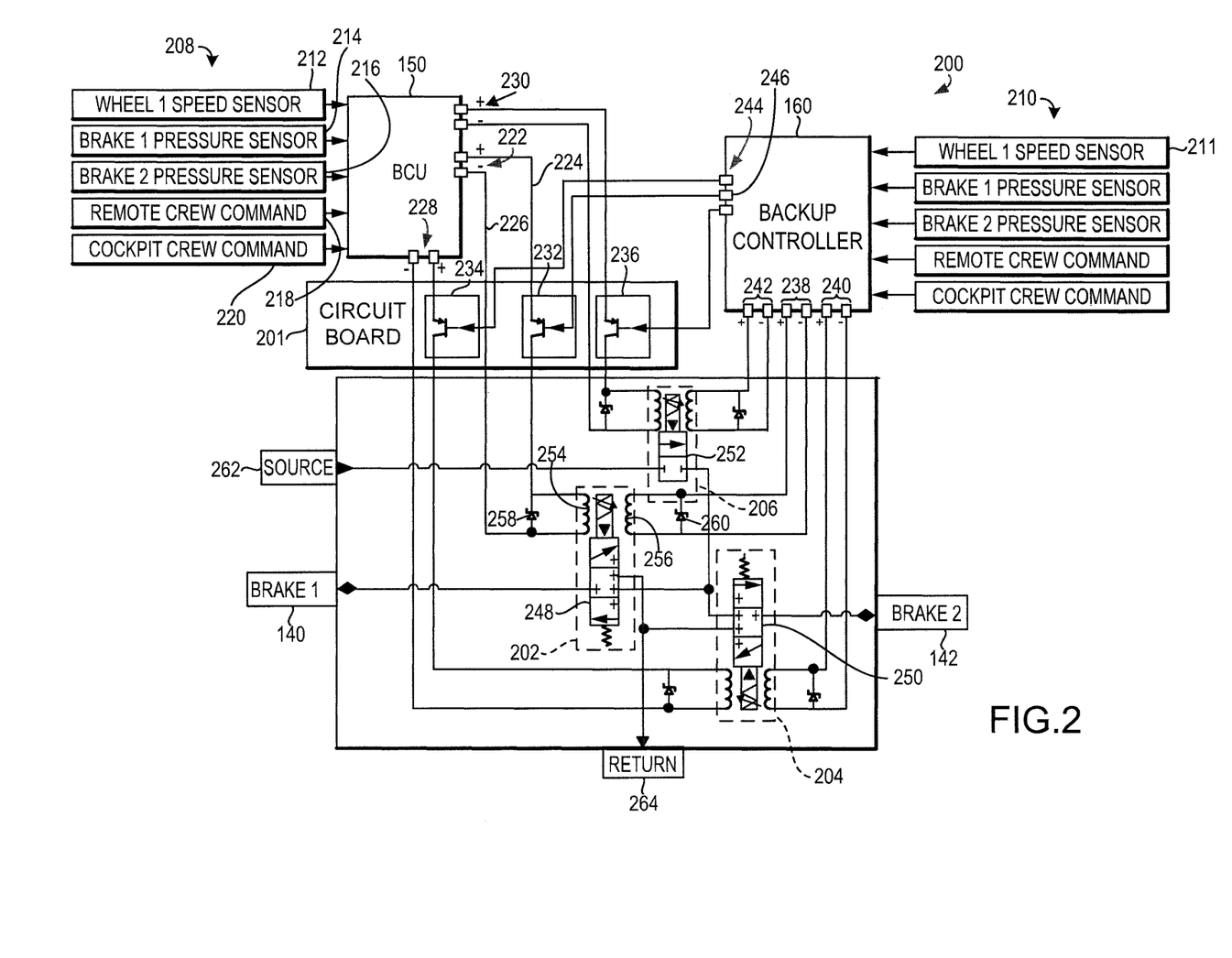
FIG. 2 illustrates a block diagram of a system for controlling operation of brakes of the aircraft of FIG. 1, in accordance with various embodiments.

Turning to FIG. 2, the aircraft 100 may include a system 200 for controlling operation of the first brake 140 and the second brake 142. The system 200 may include the BCU 150, the backup controller 160, a switch circuit board 201, and one or more brake actuator. In particular, the system 200 may include a first brake actuator 202 capable of controlling pressure applied to the first brake 140, a second brake actuator 204 capable of controlling pressure applied to the second brake 142, and a third brake actuator 206 that operates as a shut off for the first brake 140 and the second brake 142.

The BCU 150 may receive a first plurality of inputs 208. The first plurality of inputs 208 may include a wheel speed from a wheel speed sensor 212, a pressure applied to the first brake 140 by a first pressure sensor 214, a pressure applied to the second brake 142 by a second pressure sensor 216, and a crew command signal corresponding to an operator request for braking. In particular, the crew command signal may come from a remote location 218 (i.e., if the aircraft 100 of FIG. 1 is controlled remotely), or may come from a cockpit 220.

The BCU 150 may control operation of the brake actuators 202, 204, 206 based on the first plurality of inputs 208. In particular, the BCU 150 may output a first BCU control signal 222 that controls operation of the first brake actuator 202. The first BCU control signal 222 may be transmitted on a positive transmission line 224 and a negative transmission line 226. In various embodiments, the negative transmission line 226 may be coupled to a ground such that the first BCU control signal 222 is transmitted along the positive transmission line 224. The BCU 150 may further output a second BCU control signal 228 for controlling operation of the second brake actuator 204, and a third BCU control signal 230 for controlling operation of the third brake actuator 206.

The switch circuit board 201 may include a first switch 232, a second switch 234, and a third switch 236. The first switch 232 may include any electronic switch including components such as one or more transistor, vacuum tube, or the like. The first switch 232 may be electrically located between the BCU 150 and the first brake actuator 202. In that regard, the first switch 232 may be controlled to allow the first BCU control signal 222 to control the first brake actuator 202 or to prevent the first BCU control signal 222 from controlling the first brake actuator 202. The second switch 234 and the third switch 236 may operate in a similar manner.

The backup controller 160 may receive a second plurality of inputs 210. The second plurality of inputs 210 may include the same information as the first plurality of inputs 208. In various embodiments, the second plurality of inputs 210 may be redundant relative to the first plurality of inputs 208. For example, the second plurality of inputs 210 may include a wheel speed from a second wheel speed sensor 211 that is different than the wheel speed sensor 212 of the first plurality of inputs 208, yet that can detect the same wheel speed as the wheel speed sensor 212.

Based on the second plurality of inputs 210, the backup controller 160 may determine whether the BCU 150 is operating properly or improperly. For example, the backup controller 160 may receive the crew command, may calculate a desirable amount of pressure applied to the first brake 140 based on the crew command, and may compare the desirable amount of pressure to the amount of pressure applied to the first brake 140. The backup controller 160 may then determine that the BCU 150 is operating improperly in response to the applied pressure being greater than or less than the desirable amount of pressure.

The backup controller 160 may determine whether an electrical failure exists within the BCU 150. For example, the backup controller 160 may determine that the BCU 150 is operating improperly in response to the BCU 150 failing to receive power, in response to the software of the BCU 150 malfunctioning, in response to the BCU 150 becoming damaged by a surge, in response to the BCU 150 being disconnected or uninstalled, or the like.

In various embodiments, the BCU 150 may output data indicating a self-determined health of the BCU 150. The backup controller 160 may receive the self-determined health of the BCU 150 and may determine whether the BCU 150 is operating properly or improperly based on the self-determined health. However, the backup controller 160 may advantageously also determine whether the BCU is operating properly regardless of the self-determined health of the BCU 150 based on the second plurality of inputs 210 as described above.

The backup controller 160 may further determine backup or redundant control signals for controlling the brake actuators based on the second plurality of inputs 210. In particular, the backup controller 160 may determine and output a first backup control signal 238 for controlling operation of the first brake actuator 202, a second backup control signal 240 for controlling operation of the second brake actuator 204, and a third backup control signal 242 for controlling operation of the third brake actuator 206.

The backup controller 160 may further prevent the BCU 150 from controlling the brake actuators in response to determining that the BCU 150 is operating improperly. The backup controller 160 may prevent the BCU 150 from controlling the brake actuators by controlling operation of the switches in the switch circuit board 201. In particular, the backup controller 160 may output switch control signals 244 for controlling operation of the switches of the switch circuit board 201. For example, the backup controller 160 may output a first switch control signal 246 for controlling operation of the first switch 232.

The first switch 232 may have a nominal state of closed. Stated differently, the first switch 232 may be closed in response to a lack of control signal from the backup controller 160. The first BCU control signal 222 may pass through the first switch 232 and control the operation of the first brake actuator 202 in response to the first switch 232 being closed. This is beneficial because the BCU 150 may continue to control the first brake actuator 202 in response to the backup controller 160 being off-line or otherwise unavailable.

The backup controller 160 may transmit the first switch control signal 246 to cause the first switch 232 to be in an open state in response to determining that the BCU 150 is operating improperly. Simultaneously, the backup controller 160 may output the first backup control signal 238 to control the first brake actuator 202. In that regard, the backup controller 160 may simultaneously prevent the BCU 150 from controlling the first brake actuator 202 and itself control the first brake actuator 202. The backup controller 160 may similarly control the second switch 234 and the third switch 236 to allow or prevent the BCU 150 from controlling the second brake actuator 204 and the third brake actuator 206, and may likewise transmit the second backup control signal 240 and the third backup control signal 242 for controlling the second brake actuator 204 and the third brake actuator 206.

The first brake actuator 202 may include a first brake valve 248, the second brake actuator 204 may include a second brake valve 250, and the third brake actuator 206 may include a third brake valve 252.

Each of the brake valves 248, 250, 252 may be controlled electronically. In that regard, the first brake actuator 202 includes a first coil 254 and a second coil 256. The first coil 254 may be coupled to the first switch 232 and may receive the first BCU control signal 222 via the first switch 232. In that regard, as power is applied to the first coil 254 from the BCU 150, the first coil 254 may control operation of the first brake valve 248. In particular, the first coil 254 may actuate a movable component of the first brake valve 248 to cause the first brake valve 248 to become open (or closed) in response to the first coil 254 receiving the power from the BCU 150. Similarly, the second coil 256 may control the first brake valve 248 to be open or closed based on the first backup control signal 238.

A first diode 258 may be connected in parallel with the first coil 254. The first diode 258 may be designed to reduce the likelihood of damage to the first coil 254 or the first brake valve 248. In particular, current may flow through the first diode 258 in response to the first coil 254 ceasing to receive power (i.e., such as in response to the first switch 232 being controlled to be open). Without the first diode 258, the voltage across the first coil 254 may remain and may damage the first coil 254 or the first brake valve 248. A second diode 260 may be connected in parallel with the second coil 256 and may operate to allow current to flow therethrough in response to the second coil 256 ceasing to receive power from the backup controller 160.

The third brake valve 252 may be an on/off brake valve (i.e., the third brake valve 252 may be controlled to be open or to be closed). In that regard, the third brake actuator 206 may operate as a shut off actuator. In particular, the third brake valve 252 may be controlled to be open or closed via the BCU 150 or the backup controller 160. The third brake valve 252 may receive pressurized fluid from a source 262. In response to the third brake valve 252 being open, the pressurized fluid may flow to the first brake valve 248 and the second brake valve 250. In response to the third brake valve 252 being closed, the third brake valve 252 prevents the pressurized fluid from reaching the first brake valve 248 and the second brake valve 250.

The first brake valve 248 may be controlled to regulate a pressure of fluid applied to the first brake 140, and the second brake valve 250 may be controlled to regulate a pressure of fluid applied to the second brake 142. The first brake valve 248 and the second brake valve 250 may each be modulating brake valves. In that regard, the first brake valve 248 and the second brake valve 250 may be controlled to be closed, fully open, or partially open based on an amount of current flowing through the corresponding coils. The first brake valve 248 and the second brake valve 250 may be controlled to allow pressurized hydraulic fluid to flow to the first brake 140 and the second brake 142, respectively, and to allow pressurized hydraulic fluid to flow from the first brake 140 and the second brake 142 to a return 264.

Figure 3:
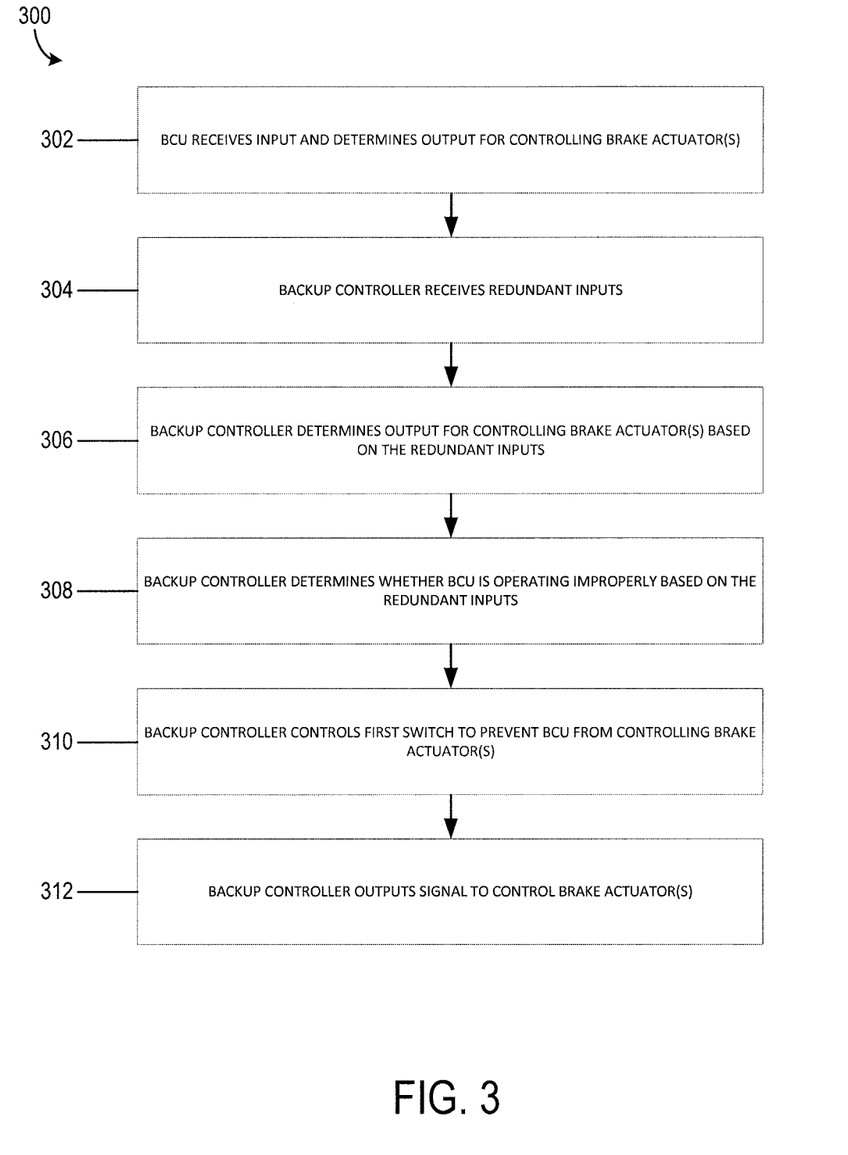
FIG. 3 is a flowchart illustrating a method for controlling operation of brakes of an aircraft, in accordance with various embodiments.

Referring now to FIG. 3, a method 300 for controlling operation of brakes of an aircraft is shown. The method 300 may begin in block 302 where a BCU of an aircraft receives input and determines output signals for controlling the brake actuators of a corresponding brake based on the received input.

In block 304, a backup controller, such as an avionics unit, may receive redundant inputs including similar information as the inputs received by the BCU but provided by a redundant source.

In block 306, the backup controller may determine output signals for controlling the brake actuators based on the redundant inputs. For example, the backup controller may determine the output signals in a similar manner as the BCU determines the output signals in block 302.

In block 308, the backup controller may determine whether the BCU is operating improperly based on the redundant inputs. For example, the backup controller may analyze the brake request from the cockpit or from a remote flight crew. The backup controller may compare the brake request to additional data, such as a wheel speed or a brake pressure, and determine whether the BCU is operating properly or improperly based on the received inputs.

In block 310, if the backup controller determines that the BCU is operating improperly, the backup controller may control a switch to prevent the BCU from controlling the brake actuators. For example, the backup controller may control a normally closed switch 232, 234, 236 to be open to prevent the output signal from the BCU from reaching the brake actuators.

In block 312, the backup controller may provide the output signals determined by the backup controller to the brake actuator for controlling the brake actuator. Upon completion of blocks 310 and 312, the backup controller has switched control of the brakes from the improperly-functioning BCU to the backup controller.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling a brake actuator corresponding to a first brake, comprising:
    a first brake actuator configured to control pressure applied to the first brake;
    a brake control unit (BCU) configured to receive a first plurality of inputs and to calculate and output a first BCU control signal for controlling the first brake actuator based on the first plurality of inputs;
    a first switch coupled between the first brake actuator and the BCU; and
    a backup controller electronically coupled to the first switch and the first brake actuator and configured to:
        receive a second plurality of inputs that is redundant to the first plurality of inputs,
        calculate a first backup control signal for controlling the first brake actuator based on the second plurality of inputs,
        determine that the BCU is functioning improperly based on the second plurality of inputs, and
        control the first switch to prevent the first BCU control signal from controlling the first brake actuator and to output the first backup control signal to the first brake actuator in response to determining that the BCU is functioning improperly.

2. The system of claim 1, wherein the first brake actuator includes:
    a first brake valve;
    a first coil coupled to the first switch and configured to control the first brake valve based on the first BCU control signal; and
    a second coil coupled to the backup controller and configured to control the first brake valve based on the first backup control signal.

3. The system of claim 2, further comprising a first diode connected in parallel with the first coil and configured to allow current to flow through the first coil until a voltage across the first coil decays in response to the first switch preventing the first BCU control signal from controlling the first brake actuator.

4. The system of claim 1, wherein the backup controller is configured to be included in an avionics unit of an aircraft.

5. The system of claim 1, further comprising:
    a second brake actuator configured to control pressure applied to a second brake; and
    a second switch coupled between the second brake actuator and the BCU, wherein:
        the BCU is further configured to output a second BCU control signal for controlling the second brake actuator based on the first plurality of inputs, and the backup controller is further configured to determine a second backup control signal for controlling the second brake actuator based on the second plurality of inputs, and to control the second switch to prevent the second BCU control signal from controlling the second brake actuator and to output the second backup control signal to the second brake actuator in response to determining that the BCU is functioning improperly.

6. The system of claim 5, further comprising:
    a third brake actuator configured to operate as a shutoff to allow or prevent pressure from being applied to the first brake and the second brake; and a third switch coupled between the third brake actuator and the BCU, wherein:
the BCU is further configured to output a third BCU control signal for controlling the third brake actuator based on the first plurality of inputs, and
the backup controller is further configured to determine a third backup control signal for controlling the third brake actuator based on the second plurality of inputs, and to control the third switch to prevent the third BCU control signal from controlling the third brake actuator and to output the third backup control signal to the third brake actuator in response to determining that the BCU is functioning improperly.

7. The system of claim 6, wherein the first brake actuator and the second brake actuator are modulating brake valves, and the third brake actuator is an on/off brake valve.

8. The system of claim 1, wherein the first plurality of inputs and the second plurality of inputs include a wheel speed, a brake pressure of the first brake, and at least one of a remote crew command or a cockpit crew command.

9. The system of claim 1, wherein the first switch has a nominal state of closed such that the first BCU control signal flows through the first switch in the nominal state, and has an active state of open in response to being controlled by the backup controller.

10. The system of claim 1, wherein:
the switch includes a transistor having a first terminal, a second terminal, and a third terminal;
the BCU is coupled to the first terminal of the transistor;
the first brake actuator is coupled to the second terminal of the transistor; and
the backup controller is coupled to the third terminal of the transistor.

11. A system for controlling a brake valve corresponding to a first brake of an aircraft, comprising:
a first brake valve configured to control pressure applied to the first brake;
a brake control unit (BCU) configured to receive a first plurality of inputs and to calculate and output a first BCU control signal for controlling the first brake valve based on the first plurality of inputs;
a first switch coupled between the first brake valve and the BCU; and
a backup controller electronically coupled to the first switch and the first brake valve and configured to:
receive a second plurality of inputs that is redundant to the first plurality of inputs,
calculate a first backup control signal for controlling the first brake valve based on the second plurality of inputs,
determine that the BCU is functioning improperly based on the second plurality of inputs, and
control the first switch to prevent the first BCU control signal from controlling the first brake valve and to output the first backup control signal to the first brake valve in response to determining that the BCU is functioning improperly.

12. The system of claim 11, wherein the first brake valve is part of a first brake actuator that further includes:
a first coil coupled to the first switch and configured to control the first brake valve based on the first BCU control signal; and
a second coil coupled to the backup controller and configured to control the first brake valve based on the first backup control signal.

13. The system of claim 12, further comprising a first diode connected in parallel with the first coil and configured to allow current to flow through the first coil until a voltage across the first coil decays in response to the first switch preventing the first BCU control signal from controlling the first brake valve.

14. The system of claim 11, wherein the backup controller is configured to be included in an avionics unit of the aircraft.

15. The system of claim 11, further comprising:
a second brake valve configured to control pressure applied to a second brake; and
a second switch coupled between the second brake valve and the BCU, wherein:
the BCU is further configured to output a second BCU control signal for controlling the second brake valve based on the first plurality of inputs, and
the backup controller is further configured to determine a second backup control signal for controlling the second brake valve based on the second plurality of inputs, and to control the second switch to prevent the second BCU control signal from controlling the second brake valve and to output the second backup control signal to the second brake valve in response to determining that the BCU is functioning improperly.

16. The system of claim 15, further comprising:
a third brake valve configured to operate as a shutoff to allow or prevent pressure from being applied to the first brake and the second brake; and
a third switch coupled between the third brake valve and the BCU, wherein:
the BCU is further configured to output a third BCU control signal for controlling the third brake valve based on the first plurality of inputs, and
the backup controller is further configured to determine a third backup control signal for controlling the third brake valve based on the second plurality of inputs, and to control the third switch to prevent the third BCU control signal from controlling the third brake valve and to output the third backup control signal to the third brake valve in response to determining that the BCU is functioning improperly.

17. The system of claim 16, wherein the first brake valve and the second brake valve are modulating brake valves, and the third brake valve is an on/off brake valve.

18. The system of claim 11, wherein the first plurality of inputs and the second plurality of inputs include a wheel speed, a brake pressure of the first brake, and at least one of a remote crew command or a cockpit crew command.

19. The system of claim 11, wherein the first switch has a nominal state of closed such that the first BCU control signal flows through the first switch in the nominal state, and has an active state of open in response to being controlled by the backup controller.

20. A method for controlling a brake actuator corresponding to a first brake, comprising:
receiving, by a brake control unit (BCU), a first plurality of inputs;
calculating, by the BCU, a first BCU control signal for controlling a first brake actuator to control pressure applied to the first brake based on the first plurality of inputs;j
outputting, by the BCU, the first BCU control signal;
receiving, by a backup controller, a second plurality of inputs that is redundant to the first plurality of inputs;
calculating, by the backup controller, a first backup control signal for controlling the first brake actuator based on the second plurality of inputs;

determining, by the backup controller, that the BCU is functioning improperly based on the second plurality of inputs;

controlling, by the backup controller, a first switch coupled between the first brake actuator and the BCU to prevent the first BCU control signal from controlling the first brake actuator in response to determining that the BCU is functioning improperly; and outputting, by the backup controller, the first backup control signal to the first brake actuator in response to determining that the BCU is functioning improperly.

\* \* \* \* \*

UNITED STATES PATENT AND TRADEMARK OFFICE
CERTIFICATE OF CORRECTION

| | | |
|---|---|---|
| PATENT NO. | : 10,773,698 B2 | Page 1 of 1 |
| APPLICATION NO. | : 15/714947 | |
| DATED | : September 15, 2020 | |
| INVENTOR(S) | : Efrem E. Ayichew | |

It is certified that error appears in the above-identified patent and that said Letters Patent is hereby corrected as shown below:

On the Title Page

Item [74], Attorney, Agent, or Firm delete "Shell" and insert --Snell--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*